(12) United States Patent
Dayan et al.

(10) Patent No.: US 7,245,207 B1
(45) Date of Patent: Jul. 17, 2007

(54) CAMERA AND DISPLAY DEVICE FOR USE WITH VEHICLES

(75) Inventors: Mervin A. Dayan, Oakhurst, NJ (US); Maurice S. Dayan, Oakhurst, NJ (US); Larry D. Sharp, Tinton Falls, NJ (US)

(73) Assignee: Intellectual Solutions, Inc.

( * ) Notice: Subject to any disclaimer, the term of this patent is extended or adjusted under 35 U.S.C. 154(b) by 0 days.

(21) Appl. No.: 11/567,504

(22) Filed: Dec. 6, 2006

Related U.S. Application Data

(63) Continuation-in-part of application No. 29/258,861, filed on Apr. 28, 2006, now Pat. No. Des. 536,016, and a continuation-in-part of application No. 29/258,863, filed on Apr. 28, 2006, now Pat. No. Des. 536,012, and a continuation-in-part of application No. 29/252,238, filed on Jan. 20, 2006, now Pat. No. Des. 535,676, and a continuation-in-part of application No. 29/252,239, filed on Jan. 20, 2006, now Pat. No. Des. 536,360, and a continuation-in-part of application No. 29/252,296, filed on Jan. 20, 2006, now Pat. No. Des. 536,011.

(60) Provisional application No. 60/826,618, filed on Sep. 22, 2006.

(51) Int. Cl.
*B60Q 1/00* (2006.01)
*G08G 1/017* (2006.01)
*G08G 1/054* (2006.01)

(52) U.S. Cl. .................. 340/435; 340/937; 348/148

(58) Field of Classification Search .................. 340/435
See application file for complete search history.

(56) References Cited

U.S. PATENT DOCUMENTS

| 4,895,326 | A | 1/1990 | Nimpoeno |
| 5,455,625 | A * | 10/1995 | Englander .................. 348/375 |
| 5,852,754 | A | 12/1998 | Schneider |
| 6,259,475 | B1 * | 7/2001 | Ramachandran et al. ... 348/148 |
| 6,515,581 | B1 | 2/2003 | Ho |
| 7,106,183 | B2 | 9/2006 | Hong |
| 2006/0072011 | A1 | 4/2006 | Okada |
| 2006/0164220 | A1 * | 7/2006 | Harter et al. ............... 340/435 |
| 2006/0171704 | A1 | 8/2006 | Bingle |

OTHER PUBLICATIONS

FrameCAM Installation Manual, by HitchCAM 5800 Bandinl Blvd., Commerce, CA 900402.
Instruction (CMOS) Disclosure Installation Manual (author and publication information unknown).

* cited by examiner

*Primary Examiner*—Benjamin C. Lee
*Assistant Examiner*—Eric M. Blount
(74) *Attorney, Agent, or Firm*—Brian L. Belles; Wolf, Block, Schorr & Solis-Cohen LLP

(57) ABSTRACT

A safety system for use with a vehicle. The camera is capable of wirelessly transmitting signals to the display device. The camera can be specially mounted onto the rear of the vehicle. The display device may be mounted in the interior of the vehicle. The camera and display device may be automatically activated when the vehicle is place in reverse.

20 Claims, 11 Drawing Sheets

FIG. 3a
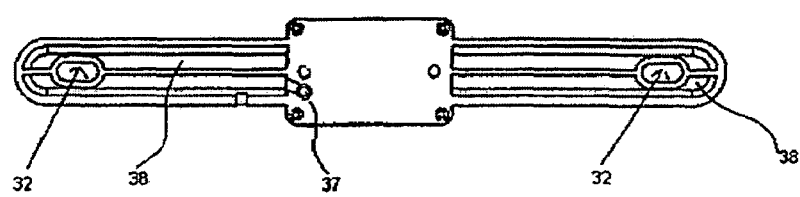
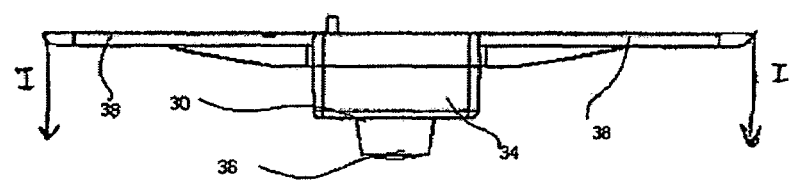
FIG. 3b
FIG. 3c
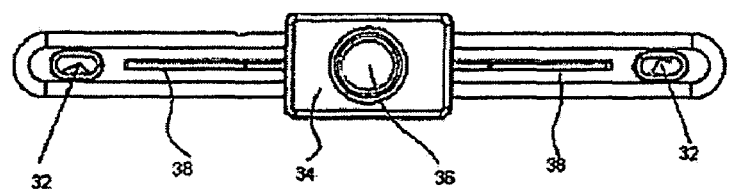
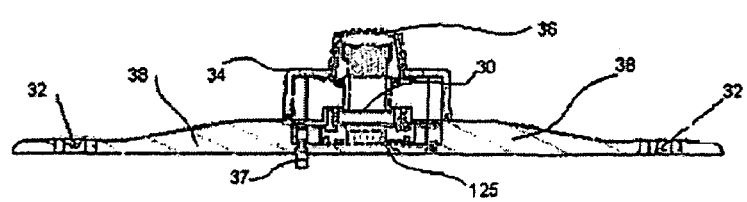
FIG. 3d

FIG. 7a
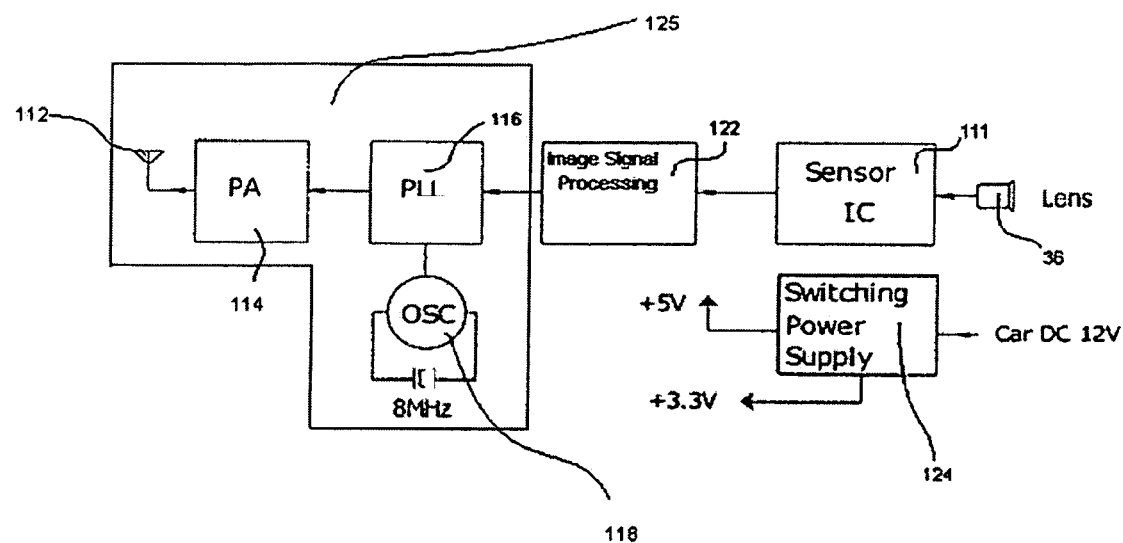
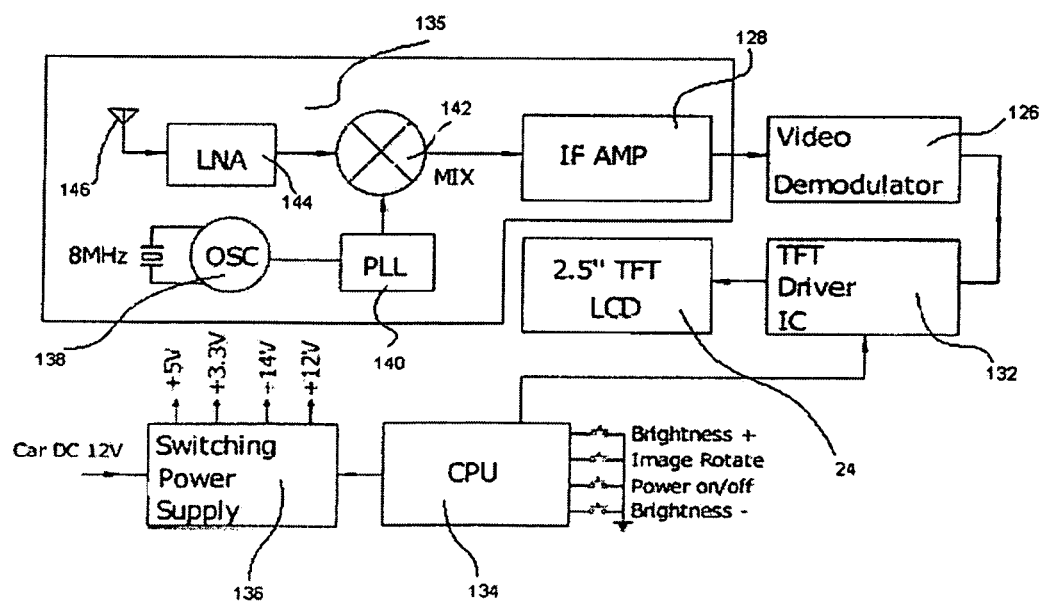
FIG. 7b

CAMERA AND DISPLAY DEVICE FOR USE WITH VEHICLES

CROSS-REFERENCE TO RELATED PATENT APPLICATIONS

The present application is a continuation-in-part of U.S. Design Pat. Application 29/252,238, filed Jan. 20, 2006 now U.S. Pat. No. D,535,676, U.S. Design Pat. Application 29/252,239, filed Jan. 20, 2006 now U.S. Pat. No. D,536,360, U.S. Design Pat. Application 29/252,296, filed Jan. 20, 2006 now U.S. Pat. No. D,536,011, U.S. Design Pat. Application 29/258,861, filed Apr. 28, 2006 now U.S. Pat. No. D,536,016 and U.S. Design Pat. Application 29/258,863, filed Apr. 28, 2006 now U.S. Pat. No. D,536,012 and also claims the benefit of U.S. Provisional Patent Application 60/826,618, filed Sep. 22, 2006, the entireties of which are hereby incorporated by reference in their entireties.

FIELD OF THE INVENTION

The present invention relates generally to safety systems in vehicles, and specifically to systems and methods for monitoring an area behind a vehicle.

BACKGROUND OF THE INVENTION

When operating a vehicle in reverse it is sometimes difficult to properly view everything that is behind it. In the past people have attempted to ameliorate the lack of visibility when in reverse by placing mirrors at various locations throughout the car. Mirrors have proven to be a reliable method of viewing things while in reverse. However the usage of mirrors is still plagued by not having a totally unobstructed view of the space behind a vehicle.

Recently, the usage of cameras and sensors has become popular in order to detect the presence of items behind a vehicle. The detection of items previously unseen through the usage of mirrors has prevented many unfortunate events. However, despite the usage of these devices problems still persist.

When mounting a camera on a vehicle its placement is important so as to offer a proper view of those objects located behind it. Many cameras are unable to provide a proper viewing angle for the vehicle upon which it is mounted. Therefore there is a need for a camera that is capable of being properly mounted on a vehicle and that is able to be adjusted in order to compensate for the variations in the structure of different vehicles.

Additionally, cameras that are mounted on vehicles are exposed to the effects of the environment, such as changes in temperature, humidity, etc. can cause moisture to form on the lens thereby decreasing the effectiveness of the camera. Therefore it is additionally important to ensure that the clarity of the lens is not compromised as result of environmental factors.

Thus, there is a need for a camera and display device for a vehicle that is able to provide appropriate angles of view and remain uncompromised during exposure to the environment.

SUMMARY OF THE INVENTION

It is therefore an object of the present invention to provide a system and method that provides for improved viewing of the area behind a vehicle.

Another object of the present invention is to provide a system for viewing the area behind a vehicle that can be properly and easily installed by end users.

Still another object of the present invention is to provide a system and method for viewing the area behind a vehicle that allows vertical flipping of the transmitted image.

Yet another object of the present invention is to provide a wireless backup camera system.

A further object of the present invention is to provide a system and method for viewing the area behind a vehicle that affords an adjustable angle of the camera lens.

A yet further object of the present invention is to provide a system and method for viewing the area behind a vehicle that minimizes fogging of the camera lens.

A still further object of the present invention is to provide a system and method for viewing the area behind a vehicle that provides automatic activation/operation of the component devices.

These and other objects are met by the present invention, which in a first aspect can be a system for monitoring an area around a vehicle comprising: a housing having elongated flanges extending from the housing for mounting to the rear portion of a vehicle; a camera provided within the housing, wherein the camera produces an image signal based upon a received image; a transmitter operably coupled to the camera for transmitting the image signals; a display device having a means for mounting the display device within a passenger compartment of the vehicle, the display device further comprising a receiver for receiving the image signal; an image processing unit operably connected to the receiver, wherein the image processing unit is capable of manipulating the image signal in order to invert the received image; the display device operably connected to the image processing unit and adapted to display the received image; and wherein the camera and the transmitter are activated when the vehicle is placed into reverse and the display device is activated upon receiving an image signal from the transmitter.

In another aspect, the invention can be a system for monitoring an area around a vehicle comprising: a first housing adapted for mounting to a rear portion of a vehicle; a camera provided within the first housing, wherein the camera produces an image signal corresponding to a perceived image; a cable for transmitting the image signal, the cable having a first end operably connected to the camera; a second housing located at a second end of the cable; a transmitter provided within the second housing and operably coupled to the second end of the cable, the transmitter wirelessly transmitting the image signal received from the camera via the cable; a display device having a means for mounting the display device within a passenger compartment of the vehicle, the display device further comprising a receiver for receiving the image signal; an image processing unit operably connected to the receiver, wherein the image processing unit is capable of manipulating the received image signal; and the display device operably connected to the image processing unit and adapted to display an image based on the received image signal.

In yet another aspect the invention can be a system for monitoring an area around a vehicle comprising: a first housing adapted for mounting to a rear portion of a vehicle; a camera provided within the first housing, wherein the camera produces an image signal corresponding to a perceived image; a transmitter provided within the second housing and operably coupled to the second end of the cable, the transmitter wirelessly transmitting the image signal received from the camera; a display device having a means for mounting the display device within a passenger compartment of the vehicle, the display device further comprising a receiver for receiving the image signal; an image processing unit operably connected to the receiver, wherein the image processing unit is capable of manipulating the received image signal; and the display device operably connected to the image processing unit and adapted to display an image based on the received image signal; wherein the display device is activated upon receiving an image signal from the transmitter.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3a is a rear view of a camera of FIG. 1, according to an embodiment of the present invention.

FIG. 3b is a side view of the camera of FIG. 1.

FIG. 3c is a front view of the camera of FIG. 1.

FIG. 3d is a cross-sectional view of a camera FIG. 1 taken along the line 1 shown in FIG. 3b.

FIG. 5b is a side view of the positioner of FIG. 5a.

FIG. 7a is a schematic of the electrical components of the camera of FIG. 1, according to an embodiment of the present invention.

FIG. 7b is a schematic of the electrical components of the display device of FIG. 1, according to an embodiment of the present invention.

DETAILED DESCRIPTION OF THE DRAWINGS

Figure 1:
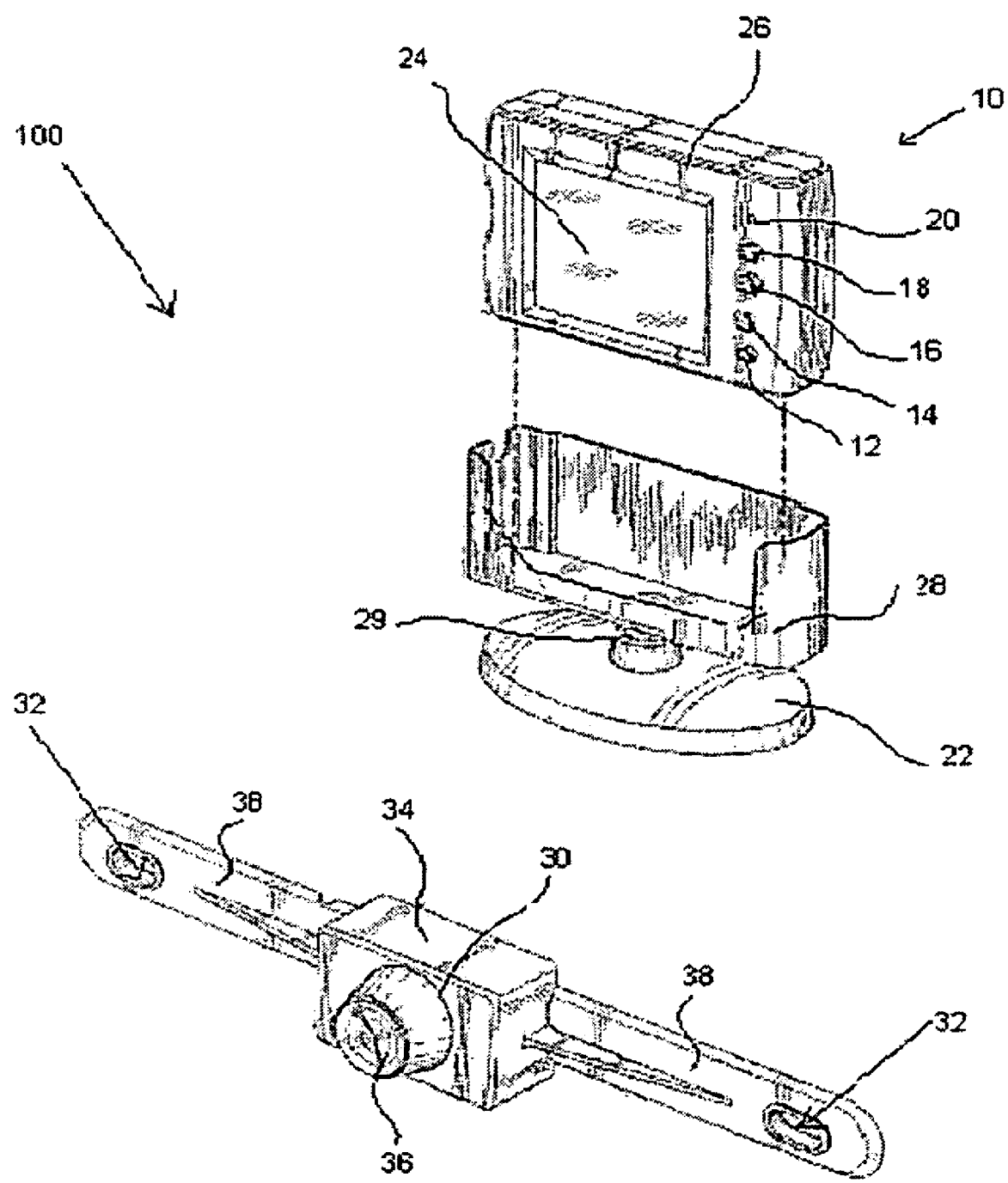
FIG. 1 is a front view of the system having a camera, display device and stand, according to an embodiment of the present invention.

A front view of the system 100 in accordance with an embodiment of the instant invention is shown in FIG. 1. The system 100 has a camera 30 and a display device 10. A holding device 28 and a stand 22 may also be part of the system 100. The display device 10 and the camera 30 are discussed in greater detail below.

Figure 2:
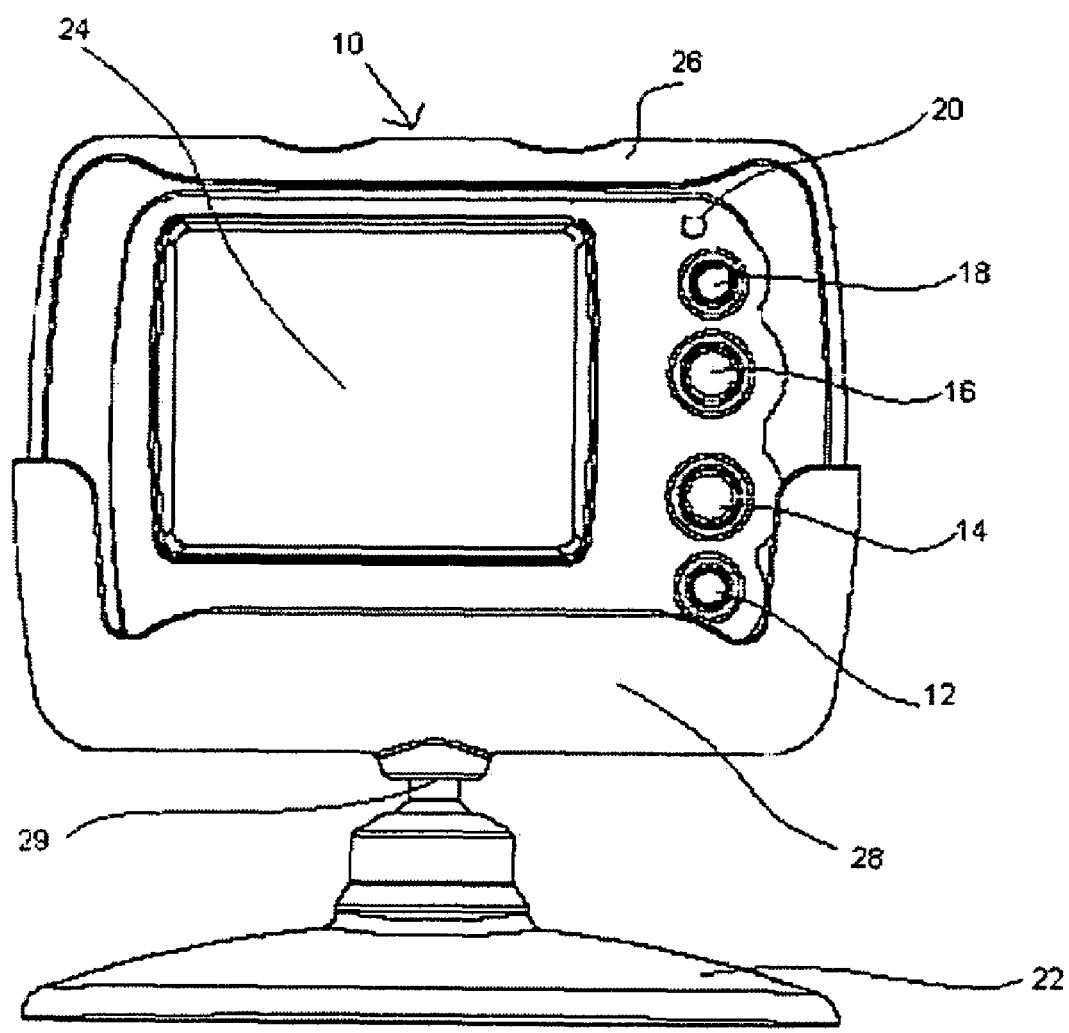
FIG. 2 is a front view of the display device, holder and stand of FIG. 1, according to an embodiment of the present invention.
Figure 9:
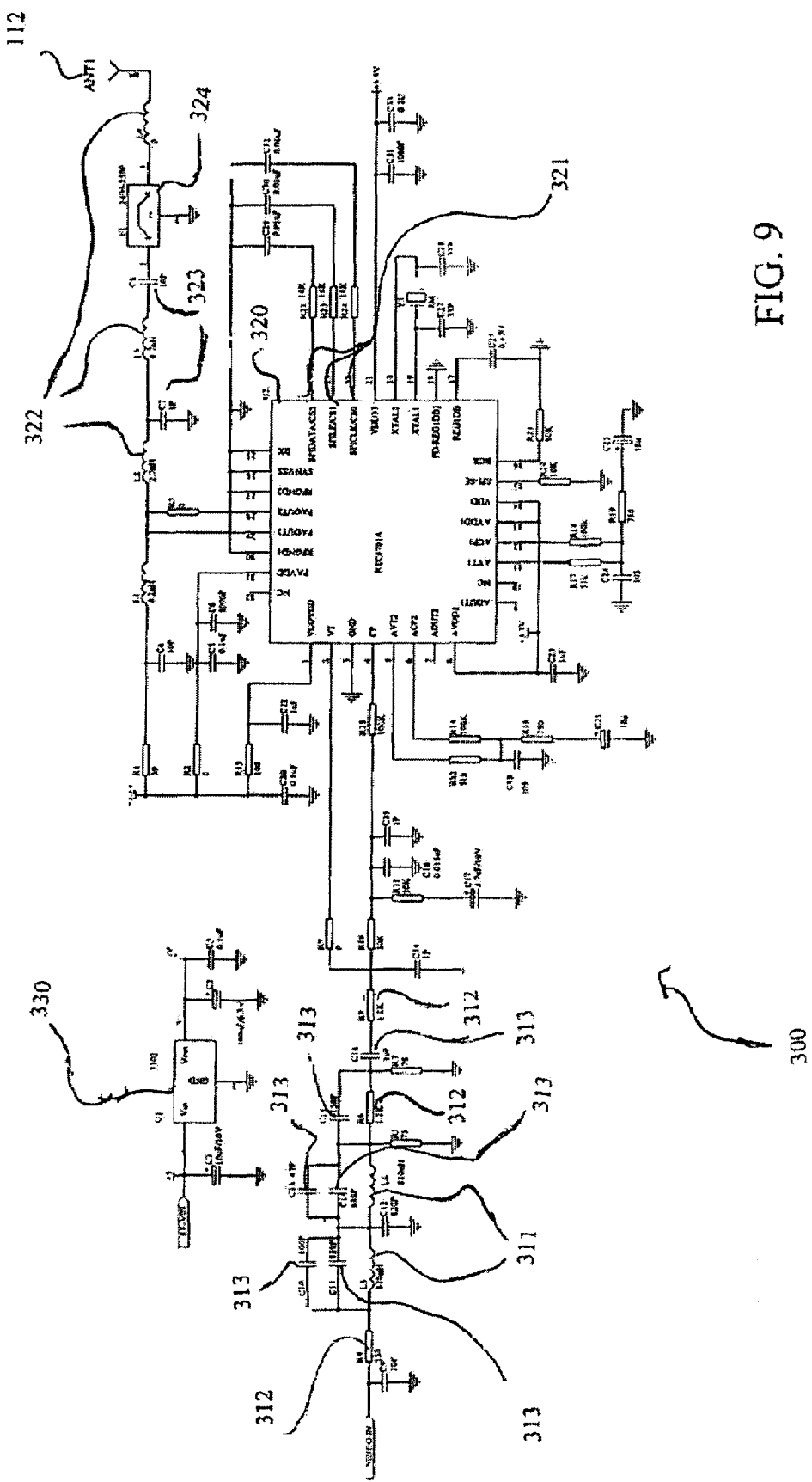
FIG. 9 is a circuit diagram of the transmitter and its associated components which are part of the camera shown in FIG. 1, according to an embodiment of the present invention.
Figure 10:
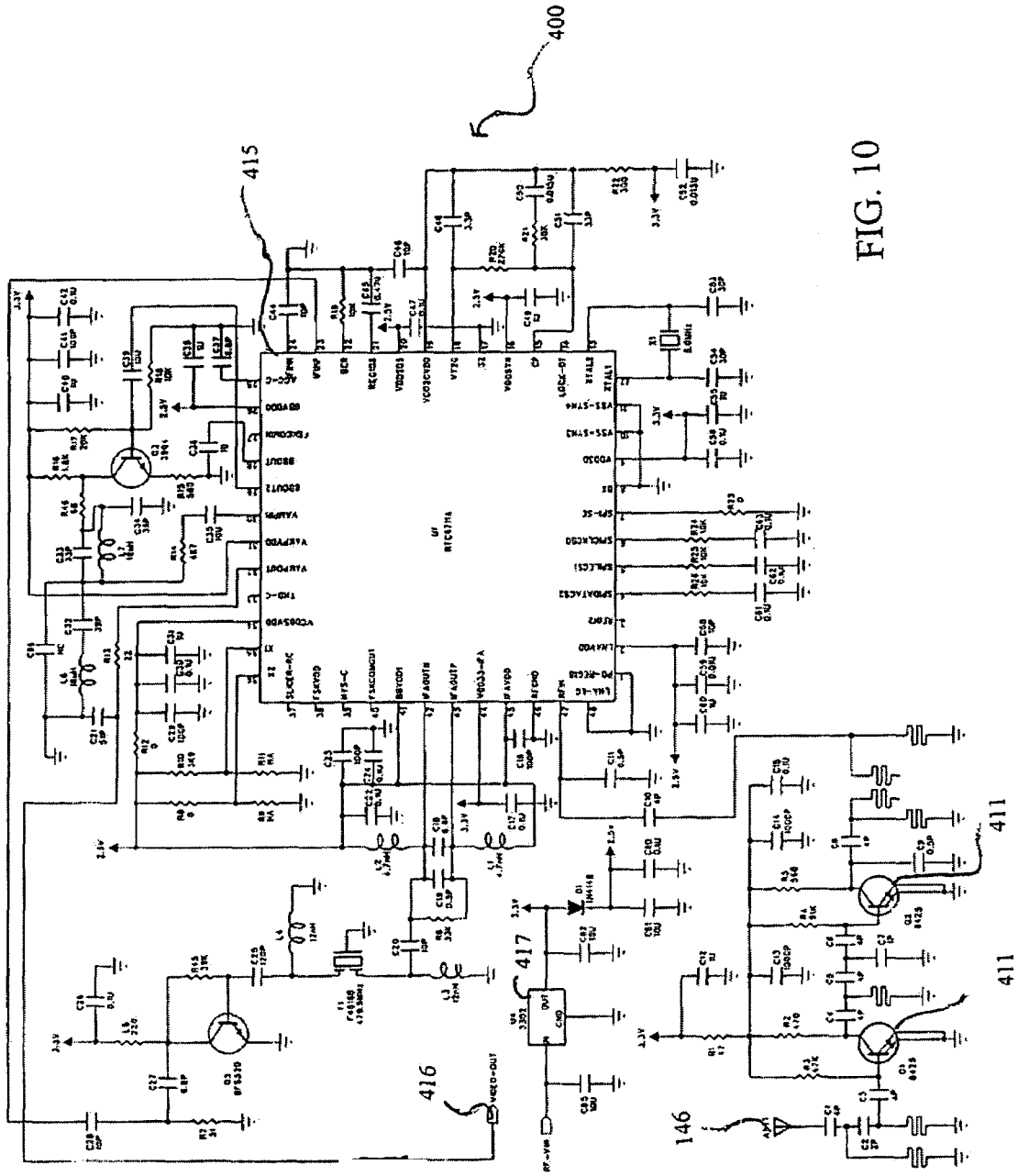
FIG. 10 is a circuit diagram of a receiver and its associated components which are part of the display device shown in FIG. 1, according to an embodiment of the present invention.

FIG. 2 is a front view of the display device 10 shown in FIG. 1. The display device 10 is a compact device that is placed within a vehicle. The display housing 26 comprises the main body of the display device 10. Placed within the display housing 26 are the electrical components that enable operation and control of the screen 24. Reference can be made to FIGS. 6b, 9 and 10 for more detailed information regarding the electrical components of the display device 10 and the corresponding circuitry.

On the front of the display housing 26 a screen 24 is located. The screen 24 may be sized in order to afford a proper view to the operator of the vehicle in which it is placed. The screen 24 shown in FIG. 2 is roughly 2.5 inches when measured diagonally. However it is to be understood that the size of screen 24 may vary depending upon the size of the vehicle and viewing needs of the operator of the vehicle. The screen 24 may be a thin film liquid crystal display, or alternatively some other type of display device that is capable of being able to produce an image.

Placed along one side of the front of the display housing 26 are a number of controls. The controls that are placed on display device 10 control various features of the camera 30 and/or the display device 10. In addition to the controls there may be a status light 20 that indicates whether or not the display device 10 is powered on or not. The status light 20 is preferably located on the front of the display device 10 so as to be visible.

Still referring to FIG. 2, an increase brightness button 18 is provided below the status light 20 and may be depressed in order to increase the brightness of the screen 24. Also placed on the display device 10 is a decrease brightness button 12. The decrease brightness button 12 is used to lower the brightness of the screen 24. It is also possible to combine the control features of the increase brightness button 18 and the decrease brightness button 12 into one button for control.

Still referring to FIG. 2, below the increase brightness button 18 is the view adjust button 16. The view adjust button 16 is capable of being depressed in order to change the angle and/or view that is displayed on screen 24. The image shown may be a forward image, a mirror image, a forward upside down image, a mirror upside down image, or some other alternative image type. In the event that more than one camera 30 would be used it is possible to have the view adjust button 16 switch between the different cameras 30. In another alternative embodiment it may be possible to use the view adjust button 16 to manipulate the direction in which the camera 30 points, through the manipulation of servos, etc.

The power button 14 is placed with the other controls. Depressing the power button 14 turns the display device 10 on and off. It is also possible to have additional buttons, knobs and/or dials placed on the display device 10 for controlling either the display device 10 or the camera 30. In an alternative embodiment of the instant invention the display device 10 is activated upon receipt of an image signal sent from the camera 30 by the transmitter. This insures that the operator of the vehicle will have access to the visibility afforded by the system 100 and not be required to manually activate the display device 10. Display device 10 may also be activated upon the starting the vehicle, or when the car is placed into a certain gear.

Returning now to FIG. 1 as well as FIG. 2, the display housing 26 is placed inside a holding device 28 that is sized and shaped to hold the display device 10 securely while inside a vehicle. The holding device 28 may have securement means placed on the inside surface that can further securely hold the display device 10, or, as in FIG. 2, the shape of the holding device 28 may be cradle the display housing 26 in such a manner so as to prevent dislodgment during the operation of the vehicle. The holding device 28 may have additional securement means that may be attached to the bottom of the holding device 28 and may be further attached to the display housing 26. The further securement means may consist of placing a male projection with a female receptacle on the holding device 28. A stand 22 is attached to the holding device 28 via a swivel member 29 so that it is capable of being swiveled when placed with a vehicle.

The stand 22 is capable of being mounted to the interior of a vehicle. The mounting means may be adhesive material that is placed on the bottom of the stand 22 so that the stand 22 may be attached to the surface of a dashboard or some other interior of the vehicle. Alternatively, there may be hook and loop fastener tape attached to the dashboard and the corresponding material attached to the base of the stand 22. This permits the stand 22 to easily placed and removed from the interior of the vehicle.

Preferably the stand 22 and the display device 10 are placed in a location where the operator of the vehicle is capable of seeing it. The display device 10 may be attached to the visors used in a vehicle, to the rear-view mirror, or to the windshield. When mounting the display device 10 directly to a visor or mirror it may not be necessary to use the holder 28 or the stand 22, however these devices may still be used in conjunction with other means for securing the display device 10 to the interior of the vehicle.

The display device 10 may use batteries in order to operate it, or may alternatively use a 12 volt adaptor that is plugged into a vehicle's lighter socket. Alternatively, the display device 10 may have a power cable attached to a vehicle's fuse block. It may also be possible to hardwire the display device 10, as well as the camera 30, to the reverse light circuit. When hardwired to the reverse light circuit, the display device 10 will switch on when the vehicle is placed into reverse and will turn off when placed into drive or forward.

Figure 8:
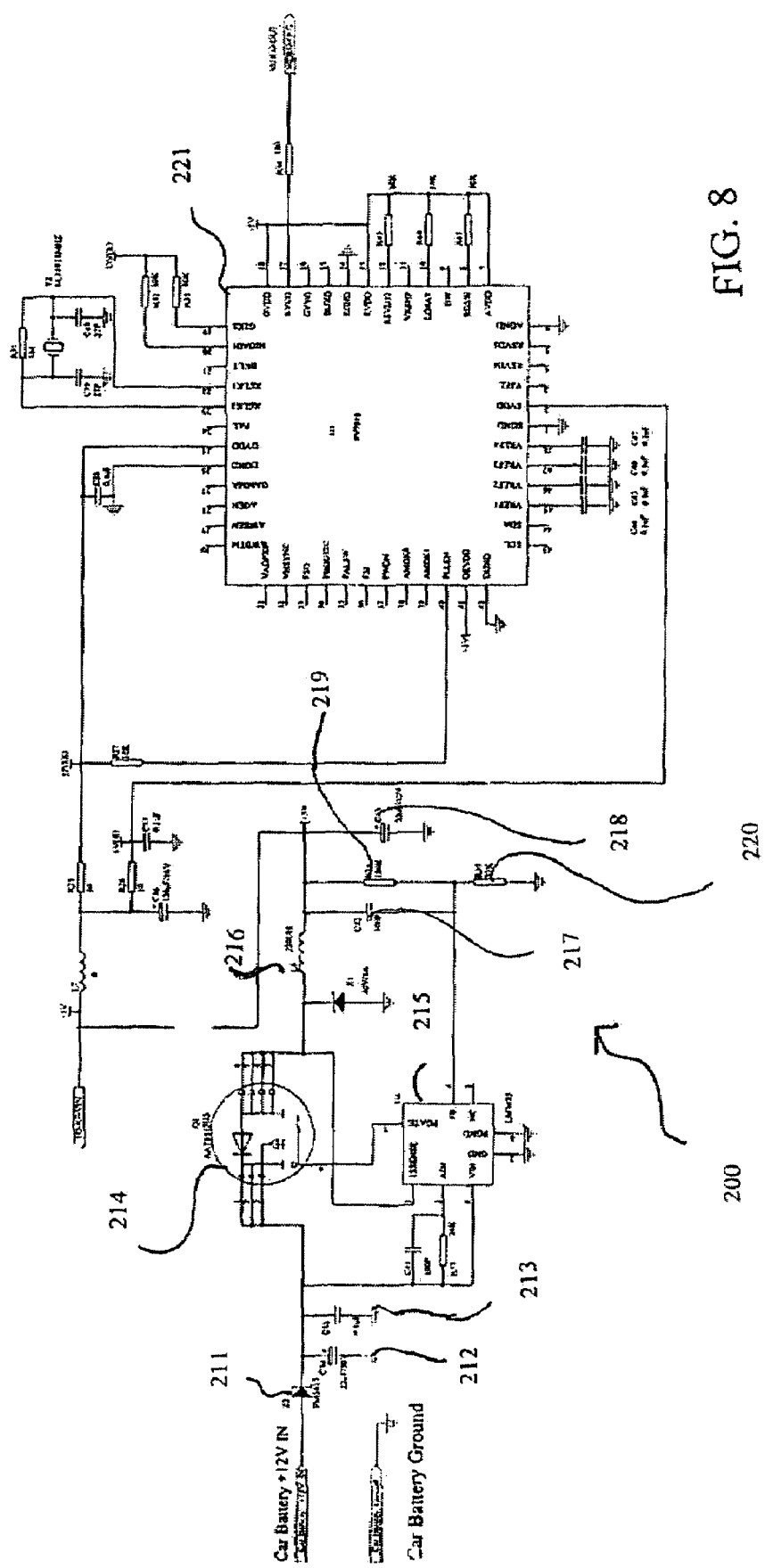
FIG. 8 is circuit diagram for an image sensor and its associated components which are part of the camera shown in FIG. 1, according to an embodiment of the present invention.

FIGS. 3a-3d illustrate a wireless camera 30, according to the embodiment of the present invention shown in FIG. 1, from a variety of angles. The camera 30 has a housing 34 that contains the electrical components and internal circuitry of the camera 30. Reference can be made to FIGS. 7a, 8 and 9, wherein this circuitry is illustrated and discussed in further detail below. The housing 34 may be sealed watertight, using a gasket seal, or some other type of mechanism that is able to prevent the entry of moisture into the housing 34 of the camera 30. The space within the housing 34 may be pressurized with an inert gas, which may be a non-reactive gas, such as $CO_2$, $N_2$ (nitrogen gas), or a noble gas such as helium, xenon, etc. in order to purge all moisture from the camera 30 and from the components of the transmitter 125. Removal of the moisture from the housing 34 prevents the lens 36 from becoming clouded or fogged when it is exposed to the variable conditions of the environment.

Attached to the housing 34 is a lens 36. The lens 36 shown in FIGS. 3b-3d has a vertical camera viewing angle of up to 80° and a horizontal viewing angle of 110°. The vertical viewing angle may be up to 100° and the horizontal viewing angle may be up to 170°. Preferably the lens 36 has an ultra-violet coating for light gathering and amplification. It also may be preferable to provide the lens 36 with an additional layer of coating in order to prevent any scratches that may occur from small accidents or other events, or alternatively construct the lens out of materials such as plastics, or polycarbonate.

The housing 34 of the camera 30 has a pair of elongated flanges 38 that extend from it. The flanges 38 extend in a lengthwise direction from the housing 34 and are roughly 180° apart from each other. The flanges 38 have flange holes 32 which are spaced from the housing 34 at approximately equal distances from the housing 34. The flange holes 32 are used in order to secure the camera 30 to the rear of a vehicle 60. The flange hole 32 is preferably oval shaped so as to have a sufficient amount of clearance space in order to accommodate attachment to the various structures of different vehicles. The flange holes 32 may have other geometric shapes depending upon the respective needs of the attachment devices and the hardware used.

Also contained within the housing 34 may be a wire 37 that further extends from a portion of the rear. The wire 37 is provided so as to be attached to a power source, such as the circuit that controls the lights that activated when a vehicle is placed into reverse. It may also be possible for the camera 30 to have an internal power supply, such as a battery, instead of the wire 37.

Figure 4:
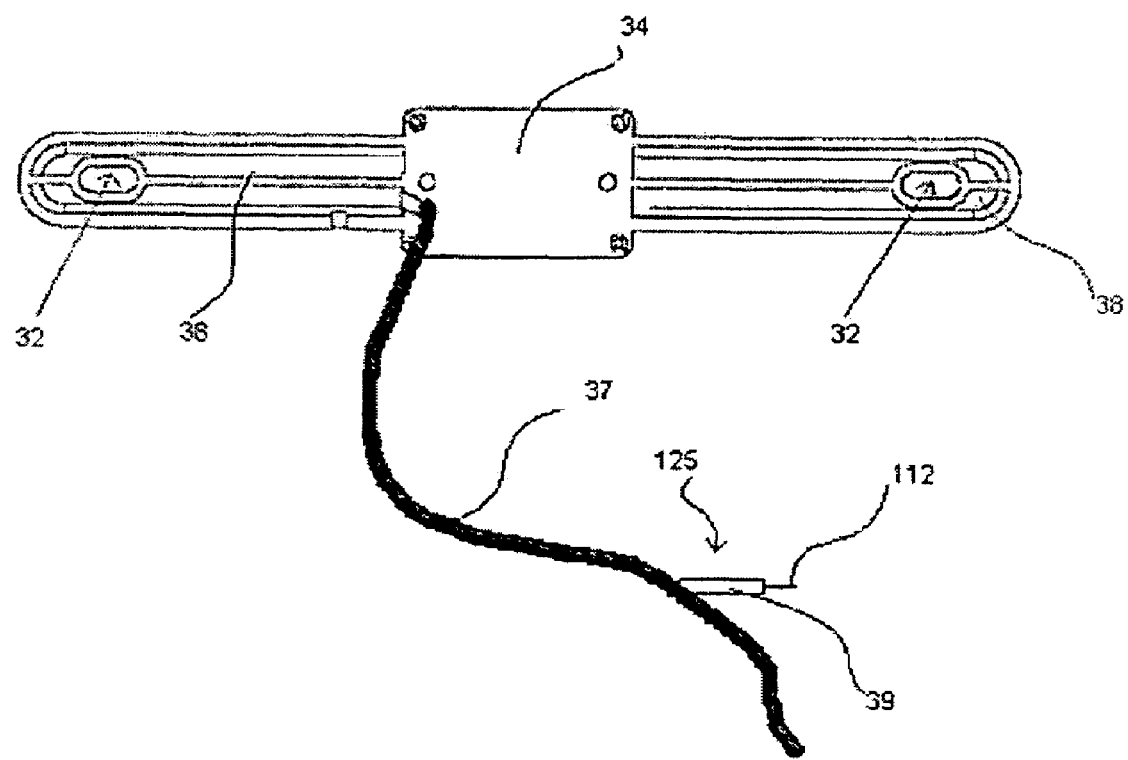
FIG. 4 is a rear view of a second embodiment of the camera having a transmitter located in a second housing.

Referring now to FIG. 4, an alternative embodiment of the camera 30 is shown in which the transmitter 125 is placed outside of the housing 34 that is used for the camera 30. The 2.4 GHz wireless signal that is emitted from the transmitter 125 must penetrate the steel body of a vehicle and travel the distance to the receiver 135 that is located within the housing display 26. The emitted image signal preferable arrives at the receiver 135 with sufficient strength so that it is able to yield a good stable image on the screen.

The output power of the transmitter 125 may not be increased in the U.S. or FCC rules are violated. However, the transmitter antenna 112 can be moved so that it is placed within the body of a vehicle and closer to the receiver 135. As shown in FIG. 4. This is done by placing at least a portion of the transmitter 125 within a transmitter housing 39, which may act as a ground plane. The transmitter antenna 112 transmits the signal. The transmitter antenna 112 may be connected to the other electrical components of the transmitter 125 via a length of coaxial cable, while only the transmitter antenna 112 is placed with the transmitter housing 39. Alternatively, the entire transmitter 125 may be located within the transmitter housing 39. The coaxial cable is preferably flexible wiring.

The coaxial cable is run in parallel to the wire 37, and both may be covered by a piece of heat shrink tubing, alternatively the transmitter 125 and the transmitter antenna 112 may be exposed. The result of locating the transmitting antenna 112 inside the vehicle is so that there is improved signal strength and less interference from external devices.

Figure 5A:
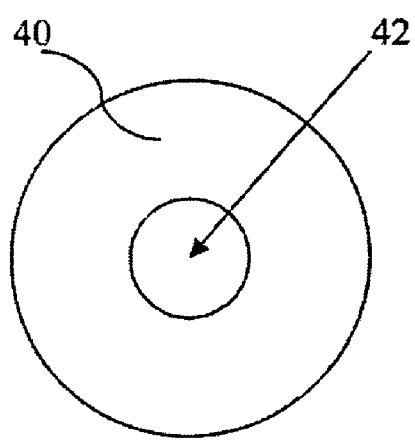
FIG. 5a is a front view of a positioner according to an embodiment of the present invention.
Figure 5B:
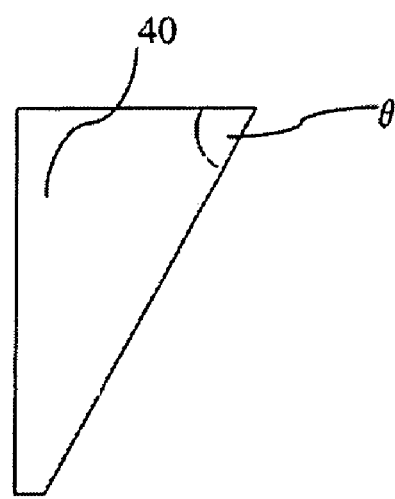

Referring now to FIGS. 5a and 5b the positioner 40 is used during the installation of the camera 30. Preferably mounting the camera 30 involves the use of one or more positioners 40. The positioner 40 as illustrated may be made of flexible plastic material, rubber material, and/or some other flexible material.

FIG. 5a is a front view of an embodiment of the positioner 40 used in the instant invention. The positioner 40 is a ring-like structure that is circular in shape when viewed from the front. The positioner 40 has a hole 42 that is also circular in shape and extends through the body of the positioner 40.

The side view of the positioner 40 shown in FIG. 5*b* illustrates that one side of the positioner 40 may be sloped, thereby forming a wedgelike structure. The sloped face of the positioner 40 helps angle/orient the camera 30 so that it is positioned properly when mounted to a vehicle. The slope preferably has an angle θ between 15-75°, however it may be adjusted depending upon the specific needs of the vehicle upon which the camera 30 is to be mounted. The positioner hole 42 may also have a sloped interior so as to properly orient a screw 70 during the mounting process.

It is possible to provide a plurality of positioners 40 that are angled at a variety of different slopes. The angle θ of the slope used may vary based upon the desired orientation of the camera 30 and the structure of the vehicle, with respect to the distance of the mounting location to the ground (e.g. the difference between a sports utility vehicle and a sedan in terms of the distance of the rear from the ground). The angle θ in FIG. 4*b* adjusts the slope of the device. The smaller the angle θ the steeper the slope will be. Preferably the system comes with a plurality of positioners 40, having a variety of angles θ, in order to accommodate mounting the camera 30 on any type of vehicle.

Figure 6:
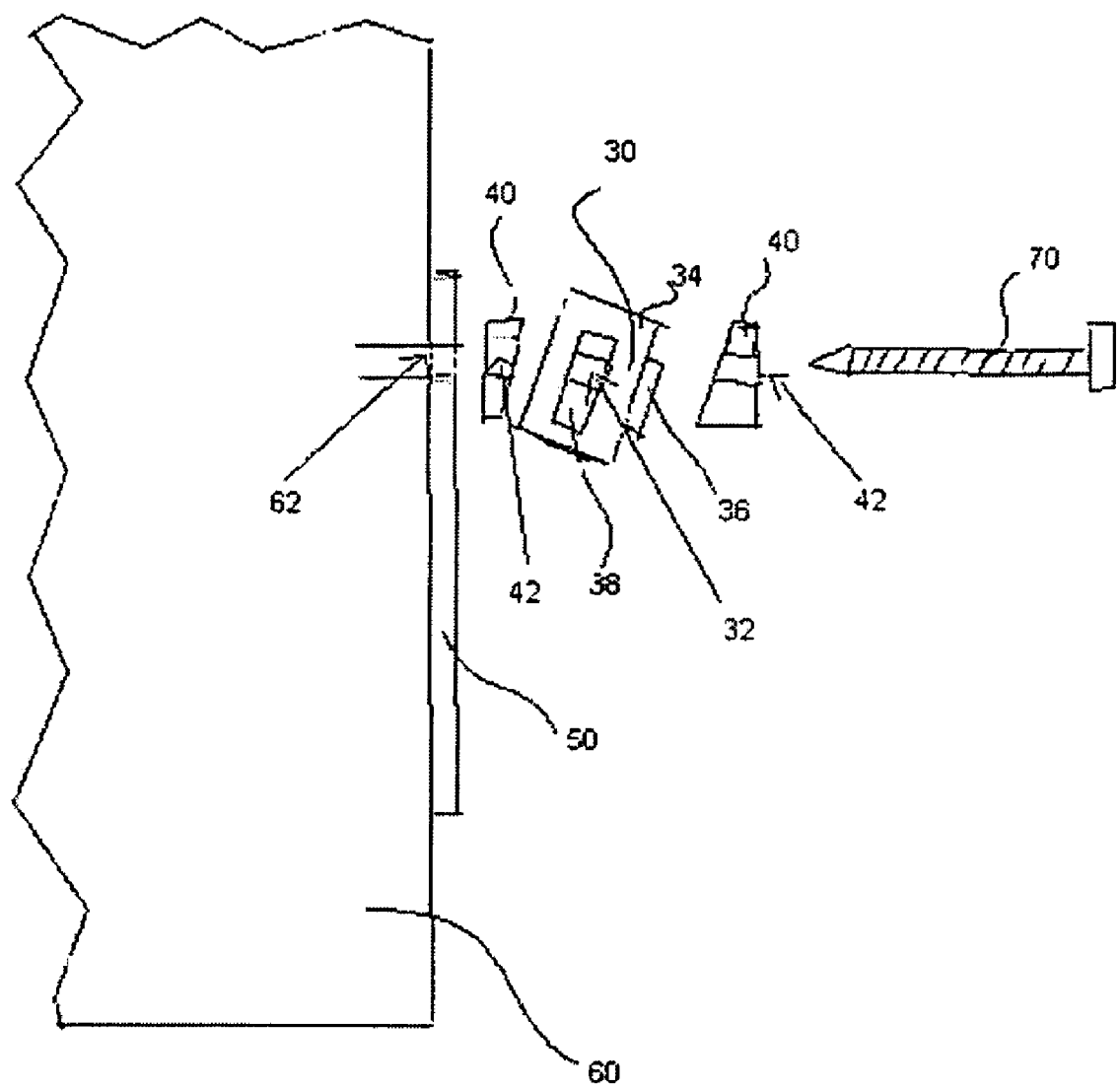
FIG. 6 illustrates the attachment of the camera of FIG. 1 to a vehicle through the usage of the positioner shown in FIG. 4a, according to an embodiment of the present invention.

FIG. 6 shows the mounting of the camera 30 to a vehicle 60. The camera 30 may be mounted through the license plate 50 of vehicle 60 by using the flange holes 32, the positioner holes 42, the plate holes 52 and the bolt holes 62.

During the mounting process a screw 70 is placed through the positioner hole 42 of a first positioner 40 that the sloped face is angled away from the vehicle 60. The screw 70 is further placed through the flange hole 32 of the flange 38. On the other side of the flange 38 is a second positioner 40. The second positioner 40 has a sloped side that is sloped towards the vehicle 60.

The screw 70 is placed through the flange hole 32 of the second positioner 40. From that point it is the placed through the plate hole 52 of the plate 50. The screw 70 is finally placed in the bolt hole 62 of the vehicle 60. This acts to secure the camera 30 to the vehicle 60.

The usage of the two positioners 40 cooperate to orient the camera 30 so that it is pointing towards the surface on which the vehicle 60 is situated. As noted above the slope of the positioner 40 provided by the angle θ may vary depending on the structure of the vehicle 60 (e.g. mounting on a SUV versus a sedan). The angled mounting permits the viewing of objects that normally would be invisible from a rear-view mirror.

It should be understood that mounting the camera 30 is not limited to the method described above. Other means for mounting the camera 30 to the vehicle 60 may be used, such as adhesives, magnets, etc. It may also be possible to mount the camera 30 so that the direction in which it points is controllable from the inside of the vehicle. This may be accomplished though the usage of servos or other devices attached to the interior of the camera 30 so that it can adjust and orient the camera 30.

FIG. 7*a* shows the electrical components of the camera 30 that are located within the housing 34 in one embodiment of the instant invention. As shown in FIG. 7*a*, connected to the lens 36 is an image sensor 111 that converts the light received through the lens 36 into electrical impulses, the image sensor 111 may be a CMOS, or some other appropriate sensor.

Still referring to FIG. 7*a*, attached to the image sensor 111 is the image signal processing circuitry 122. This circuitry takes the information received from the image sensor 111 and places it into a format usable by the display device 10. Connected to the image signal processing circuitry 122 is an 8 Mhz crystal controlled oscillator 118 and a phased locked loop 116, which form part of the transmitter 124. These two devices generate a 2.4 GHz RF signal. The produced signal is sent to the phase array 114 for isolation and amplification. The amplified signal is then sent to the transmitter antenna 112 is tuned for 2.4 GHz and transmits the generated signal to the display device 10. It is possible to transmit the signal at other frequencies and one is not limited to transmitting at 2.4 GHz.

Also part of the electrical components that may be placed within the housing 34 of the camera 30 is the switching power supply 124. The switching power supply circuitry 124 is provided for creating +3.3 V and +5V from the 12 volt DC energy from the vehicle. This provides power to the camera 30. The power is typically gathered through the wire 37, shown in FIGS. 3*a*-3*d*, that is attached to the wire that lights the reverse lights. This in turn activates the camera 30 when the vehicle is placed in reverse.

Inside the display device 10 are a number of electrical components that transform the signal received from the camera 30 into an image displayed on the display device 10. The transmitted image signal is received at receiver 135 via the receiving antenna 146. In the embodiment shown in FIG. 7*b* the receiving antenna 146 is tuned to 2.4 GHz. It should be understood that the receiving antenna 146 may be tuned to whatever frequency that that the image signal is being transmitted at.

Furthermore, receipt of the image signal may in turn automatically trigger the display device 10 to be activated. Automatic activation of the display device 10 permits the display device 10 to be activated without requiring a separate action from the user thereby insuring that the accurate viewing of the area behind the vehicle will be achieved.

Still referring to FIG. 7*b* and in particular to those components of the receiver 135, a low noise amplifier (LNA) 144 is provided inside the display housing 26 in order to boost the 2.4 GHz signal that is received via the receiving antenna 146. An 8 MHz crystal controlled oscillator 138 and phase locked loop (PLL) 140 are also provided inside the housing 26 so as to generate a base frequency.

Also part of the receiver 135, a mixer 142 is provided that is connected to the LNA 144 and the PLL 140. The mixer 142 combines the received 2.4 GHz signal and the base frequency to create an intermediate frequency (IF). The intermediate frequency signal is then sent to the intermediate amplifier 128 which increases the strength of the signal.

Still referring to FIG. 7*b*, The intermediate frequency signal is then sent to a video demodulator 126. The video demodulator strips away the IF and leaves only the image signal, which is then sent to an integrated circuit 132. In the embodiment shown in FIG. 7*b* the integrated circuit 132 is a thin film technology (TFT) driver.

A driver circuit 132 is provided for setting up and supplying the correct signals for the display 24. As discussed above, the screen 24 shows the images that are received from the image signals. The driver circuit 132 is connected to both the screen 24, and the central processing unit (CPU) 123.

The CPU 123 is used for controlling receiver functions, using image enhancement software, enabling image rotation and inversion, and providing color. The CPU 123 receives the signals generated from the operation of the controls placed on the front of the display housing 26. For example, when the brightness is adjusted, or the image angle is to be switched the CPU 123 receives the signal and acts upon it. The CPU 123 is also connected to the switching power supply circuitry and is used for creating the +3.3V, the +5V, the +12V, and the +14V from the 12 DC voltage provided by the vehicle.

Image rotation and inversion is provided so that in the event that the camera 30 is mounted incorrectly, the image may be simply adjusted so that there is no need to remount the camera 30.

FIG. 8 shows a diagram of the circuit 200 that is used for the image sensor 111 and its associated components. Shown in circuit 200, +12 Volt of direct current is applied through a zener diode 211 that provides reverse polarity voltage protection for the camera 30. The capacitors 212 and the capacitor 213 act as filters in the circuit 200. The MOSFET transistor 214 and the voltage regulator 215 form a current regulated +5 V DC regulator in the circuit 200. The inductor 216, capacitor 217, and capacitor 218 filter the output that comes from the regulator formed by MOSFET transistor 214 and regulator 215. The resistors 219 and 220 establish a voltage reference for the regulator 215.

Sensor circuit 221 and its associated components convert the light passing through the camera lens 36 into electrical impulses and determine the automatic gain control (AGC) levels and the video sync frequency for either PAL or NTSC formats. In the instant invention PAL is used, however it is to be understood that other acceptable formats may be used. The composite video output of the sensor 111 is then fed to the circuit 300 of the transmitter 125.

FIG. 9 shows the circuit 300 that is used for the transmitter 125 and its associated components. Image input from the sensor 111 is shown on the far left side of the circuit diagram. The composite image signal passes through a series of filters that are composed of inductors 311, capacitors 313, and resistors 312. These components operate together in order to form a bandpass filter that keeps unwanted frequencies from reaching the transmitter integrated circuit 320.

Still referring to the circuit diagram shown in FIG. 9, the voltage regulator 330 and its associated components convert +5 VDC to +3.3 VDC for the integrated transmitter circuit 320. The transmitter circuit 320 is a 2.4 GHz audio/visual transmitter. In the embodiment shown in FIGS. 1, 3a-3d, and 4 only the visual section is used, however it is possible to utilize the audio section should one add a microphone to the camera 30.

The oscillator 118 is used by the transmitter circuit 320 to establish a frequency reference. This frequency is divided by the internal PLL 116 into one of four frequencies: 2.414 GHz, 2.432 GHz, 2.450 GHz, 2.468 GHz. Control of the PLL 116 is determined by grounding combinations of inputs 321 to the transmitter circuit 320.

The 2.4 GHz RF output from the transmitter circuit 320 passes through low pass, and bandpass filters consisting of the inductors 322, the capacitors 323, and a 3 pin Surface Acoustic Wave (SAW) filter 324 to the transmitter antenna 112.

The transmitter antenna 112 may be a simple wire placed inside the camera housing 34, as shown in FIGS. 3a-3d, or it can be a ½ wave dipole at the end of a coaxial cable attached to the camera 30 that permits the transmitter antenna 112 to be located inside the body portion of the vehicle shown in FIG. 4.

FIG. 10 is a diagram of the circuit 400 for the 2.4 GHz receiver 146 and its associated components. The 2.4 GHz RF signal is picked up by the receiver antenna 146, which may be a simple wire that is placed inside the housing 26. The transistors 411 and their associated components amplify the RF signal and feed it to the receiver circuit 415. The receiver circuit 415 is an integrated circuit. The receiver circuit 415 and its associated components form a complete RF receiver 135 with the crystal 138, the PLL 140, and the IF amplifier 128, automatic gain control, and video outputs 416. The input pins select one of four frequencies, whichever is the same frequency as that used by the transmitter 125. A voltage regulator 417 regulates +5 V DC to +3.3 V DC. Video output from the receiver circuit 415 is fed to the CPU circuit 500.

Figure 11:
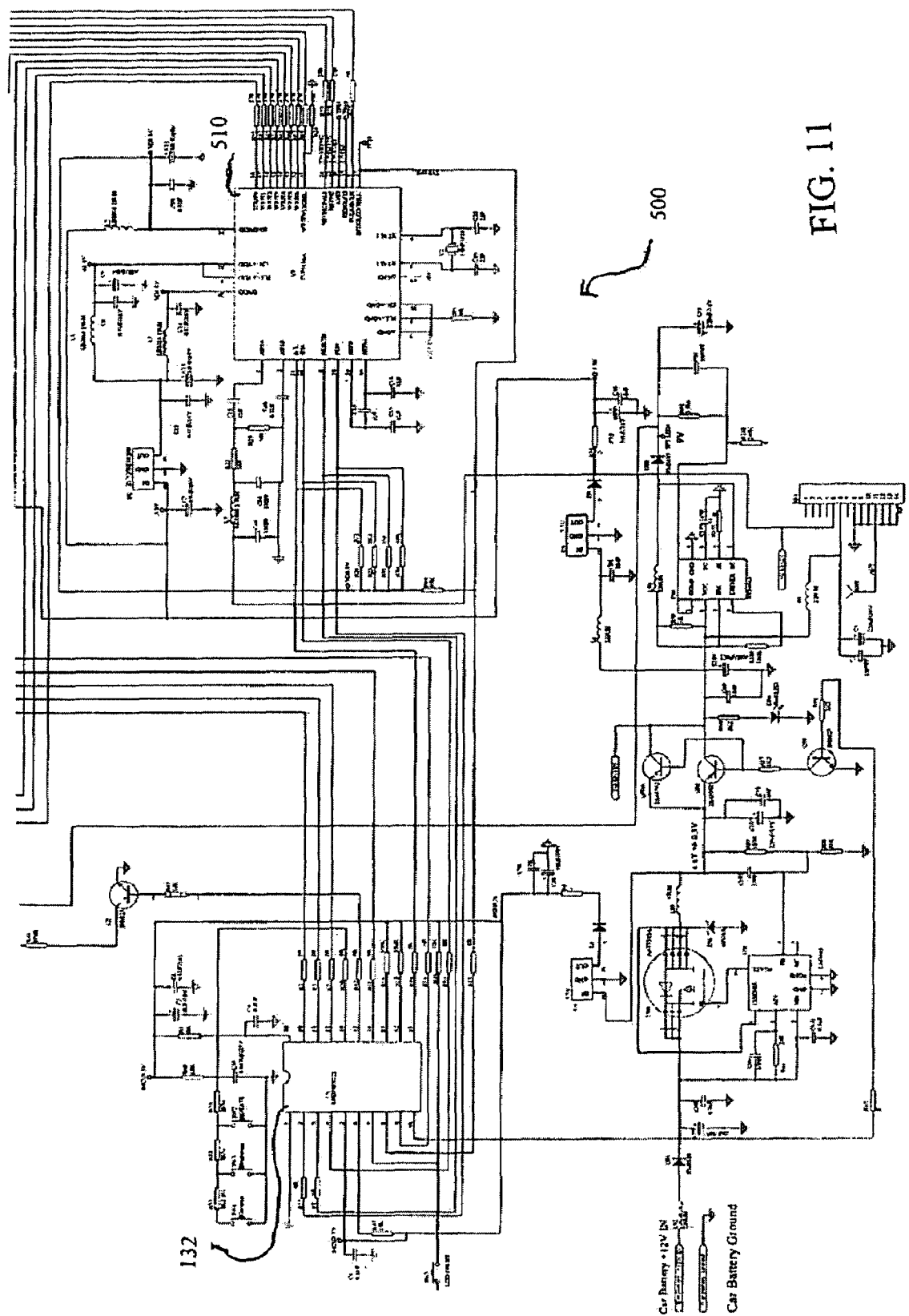
FIG. 11 is a circuit diagram for the CPU, the display, and power supply which are part of the display device shown in FIG. 1, according to an embodiment of the present invention.

FIG. 11 is a diagram of the circuit 500 for the CPU 134, the screen 24, and the power supply 136. Power for the display device 10 is applied through the same type of circuit that the transmitter 112 uses, plus additional regulators and a DC to DC converter provide all the necessary voltages for the CPU 134, the driver circuit 132, and the display 24.

The driver circuit 132 is located in the upper left section of FIG. 11. Associated components provide power, brightness, contrast, and image rotate and inversion control functions to the screen 24.

The CPU circuit 510 is located in the upper right section of FIG. 11. It accepts the image signal from the receiver 146 and provides image processing and color balance.

The display circuit 511 located in the top center of the page. It receives imaging data from the display circuit 511 of the CPU 134, and control signals from the driver circuit 132. The display circuit 511 turns the electrical impulses back into tiny pixels of light in the correct colors in order to recreate the image seen by the camera 30.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for monitoring an area behind a vehicle comprising:
    a housing having elongated flanges extending from the housing for mounting to the rear portion of a vehicle;
    a camera provided within the housing, wherein the camera produces an image signal based upon a received image;
    a transmitter operably coupled to the camera for transmitting the image signals;
    a display device having a means for mounting the display device within a passenger compartment of the vehicle, the display device further comprising a receiver for receiving the image signal;
    an image processing unit operably connected to the receiver, wherein the image processing unit is capable of manipulating the image signal in order to rotate the received image to an upside-down orientation;
    the display device operably connected to the image processing unit and adapted to display the received image; and
    wherein the camera and the transmitter are activated when the vehicle is placed into reverse and the display device is activated upon receiving an image signal from the transmitter.

2. The system of claim 1, further comprising angled positioners placed proximate to the flanges.

3. The system of claim 1, wherein the camera comprises a hermetically sealed space filled with an inert gas for preventing condensation on a lens of the camera.

4. The system of claim 1, wherein the image signal is transmitted wirelessly.

5. The system of claim 4, further comprising:
a cable for transmitting the image signal, the cable having a first end operably connected to the transmitter;
a second housing located at a second end of the cable that acts as a ground plane, the second housing located exterior of the housing; and
an antenna extending from the second housing.

6. A system for monitoring an area behind a vehicle comprising:
a first housing adapted for mounting to a rear portion of a vehicle;
a camera provided within the first housing, wherein the camera produces an image signal corresponding to a perceived image;
a transmitter for wirelessly transmitting the image signal received from the camera;
a coaxial cable extending from the first housing and having a first end operably connected to the transmitter and a second end;
a second housing connected to the second end of the coaxial cable that acts as a ground plane;
an antenna protruding from the second housing;
a display device having a means for mounting the display device within a passenger compartment of the vehicle, the display device further comprising a receiver for receiving the image signal;
an image processing unit operably connected to the receiver, wherein the image processing unit is capable of manipulating the received image signal; and
the display device operably connected to the image processing unit and adapted to display an image based on the received image signal.

7. The system of claim 6, further comprising flanges that longitudinally extend from the first housing.

8. The system of claim 6, further comprising angled positioners placed proximate to the flanges.

9. The system of claim 6, wherein the camera comprises a hermetically sealed space filled with an inert gas for preventing condensation on a lens of the camera.

10. The system of claim 6, wherein the camera and the transmitter are activated when the vehicle is placed into reverse.

11. The system of claim 6, wherein the display device is activated upon receiving an image signal from the transmitter.

12. A system for monitoring an area behind a vehicle comprising:
a housing adapted for mounting to a rear portion of a vehicle;
a camera provided within the housing, wherein the camera produces an image signal corresponding to a perceived image;
power supply wires extending from the housing for connecting the camera to a source of electricity;
a transmitter operably coupled to the camera for wirelessly transmitting the image signal received from the camera;
a cable having a first end operably connected to the transmitter and a second end adapted to operate as an antenna, the second end of the cable located exterior of the housing;
means for maintaining the cable adjacent to the power supply wires;
a display device adapted to be located within a passenger compartment of the vehicle, the display device comprising a receiver for receiving the wirelessly transmitted image signal; and
an image processing unit operably connected to the receiver, wherein the image processing unit is capable of manipulating the received image signal so that an image based on the received image signal is displayed on the display device.

13. The system of claim 12, wherein the camera and the transmitter are activated when the vehicle is placed into reverse.

14. The system of claim 12, wherein the image processing unit is capable of manipulating the image signal in order to rotate the received image to an upside-down orientation.

15. The system of claim 12, wherein the camera comprises a hermetically sealed space filled with an inert gas for preventing condensation on a lens of the camera.

16. The system of claim 12, wherein the display device is activated upon receiving the wirelessly transmitted image signal.

17. The system of claim 12, further comprising flanges that longitudinally extend from the housing, the flanges dimensioned and adapted for mounting to a license plate of the vehicle.

18. The system of claim 12, wherein the maintaining means comprises a tubing surrounding at least a portion of the cable and at least a portion of the power supply wires.

19. The system of claim 12, further comprising:
flanges that longitudinally extend from the housing, the flanges dimensioned and adapted for mounting to a license plate of the vehicle;
wherein the image processing unit is capable of manipulating the image signal in order to rotate the received image to an upside-down orientation;
wherein the cable is a coaxial cable;
a second housing connected to the second end of the coaxial cable that acts as a ground plane; and
an antenna protruding from the second housing.

20. The system of claim 1 further comprising:
power supply wires extending from the housing for connecting the camera to a source of electricity;
wherein the transmitter wirelessly transmits the image signal;
a cable having a first end operably connected to the transmitter and a second end adapted to operate as an antenna, the second end of the cable located exterior of the housing;
means for maintaining the cable adjacent to the power supply wires; and
wherein the elongated flanges are dimensioned and adapted for mounting to a license plate of the vehicle.

* * * * *

UNITED STATES PATENT AND TRADEMARK OFFICE
CERTIFICATE OF CORRECTION

PATENT NO.        : 7,245,207 B1                                            Page 1 of 1
APPLICATION NO. : 11/567504
DATED             : July 17, 2007
INVENTOR(S)       : Dayan et al.

It is certified that error appears in the above-identified patent and that said Letters Patent is hereby corrected as shown below:

Column 10, line 44, replace "the" with --a--.

Signed and Sealed this

Fourteenth Day of August, 2007

JON W. DUDAS
*Director of the United States Patent and Trademark Office*